US006821424B1

United States Patent
Branz (10) Patent No.: US 6,821,424 B1
(45) Date of Patent: Nov. 23, 2004

(54) WASTEWATER TREATMENT AND DISPERSAL SYSTEM

(76) Inventor: Steven A. Branz, 8406 Creek's Edge Ct., Oak Ridge, NC (US) 27310

( * ) Notice: Subject to any disclaimer, the term of this patent is extended or adjusted under 35 U.S.C. 154(b) by 17 days.

(21) Appl. No.: 10/132,496

(22) Filed: Apr. 25, 2002

(51) Int. Cl.[7] ................................................. C02F 3/30
(52) U.S. Cl. ...................... 210/605; 210/617; 210/747; 210/151; 210/170; 210/532.2; 405/43
(58) Field of Search .............................. 210/605, 617, 210/620, 630, 150, 151, 170, 747, 209, 220, 258, 259, 532.2; 405/43, 44, 45

(56) References Cited

U.S. PATENT DOCUMENTS

| 848,279 | A | | 3/1907 | Ashley | |
|---|---|---|---|---|---|
| 956,665 | A | | 5/1910 | Ashley | |
| 1,950,841 | A | | 3/1934 | Crawford | 210/6 |
| 3,335,082 | A | * | 8/1967 | Ullrich | 210/620 |
| 3,525,685 | A | | 8/1970 | Edwards | 210/15 |
| 3,579,995 | A | | 5/1971 | Flynn | 61/13 |
| 3,680,704 | A | | 8/1972 | Schaefer | 210/218 |
| 3,698,194 | A | | 10/1972 | Flynn | 61/11 |
| 3,823,825 | A | | 7/1974 | Bergles et al. | 210/170 |
| 3,826,742 | A | * | 7/1974 | Kirk | 210/150 |
| 3,859,215 | A | | 1/1975 | Milne | 210/170 |
| 3,879,285 | A | | 4/1975 | Yost | 210/14 |
| 3,914,164 | A | | 10/1975 | Clark | 204/149 |
| 3,919,848 | A | | 11/1975 | Sullivan | 61/11 |
| 3,962,088 | A | | 6/1976 | Kuhlenschmidt et al. | 210/170 |
| 4,002,561 | A | | 1/1977 | Traverse | 210/14 |
| 4,039,437 | A | * | 8/1977 | Smith et al. | 210/150 |
| 4,148,726 | A | | 4/1979 | Smith | 210/9 |
| 4,218,318 | A | | 8/1980 | Niimi et al. | 210/150 |
| 4,333,831 | A | | 6/1982 | Petzinger | 210/170 |
| 4,425,231 | A | | 1/1984 | Fujimoto et al. | 210/96.1 |
| 4,608,157 | A | | 8/1986 | Graves | 210/86 |
| 4,849,101 | A | | 7/1989 | Desjardins | 210/170 |
| 4,911,836 | A | | 3/1990 | Haggerty | 210/170 |
| 5,198,113 | A | | 3/1993 | Daniels | 210/608 |
| 5,342,516 | A | | 8/1994 | Rachak | 210/218 |
| 5,382,363 | A | | 1/1995 | Boylen | 210/605 |
| 5,597,264 | A | | 1/1997 | Laak | 405/36 |
| 5,618,414 | A | | 4/1997 | Goupil et al. | 210/151 |
| 5,921,711 | A | * | 7/1999 | Sipaila | 405/45 |
| 5,951,867 | A | | 9/1999 | Blough et al. | 210/620 |
| 6,200,472 | B1 | | 3/2001 | Donald et al. | 210/195.1 |
| 6,270,661 | B1 | | 8/2001 | Jowett | 210/151 |
| 6,464,865 | B2 | * | 10/2002 | Tipton et al. | 210/532.2 |
| 6,485,647 | B1 | * | 11/2002 | Potts | 210/170 |

OTHER PUBLICATIONS

Wastewater Engineering Treatment/Disposal/Reuse, Metcalf and Eddy Inc., McGraw–Hill, New York, 2d ed. 1979.

* cited by examiner

Primary Examiner—Christopher Upton
(74) Attorney, Agent, or Firm—Womble Carlyle Sandridge & Rice, PLLC (57) ABSTRACT

A dispersal field for a wastewater treatment system of the type used in conjunction with a septic tank, the dispersal field including multiple conduits, each conduit having at least one discharge opening. The configuration of each conduit and the size and position of the discharge openings causes wastewater flowing into the conduits to stand in each of the conduits below the level of the discharge openings until it has a BOD of less than about 125 mg/l.

55 Claims, 10 Drawing Sheets

WASTEWATER TREATMENT AND DISPERSAL SYSTEM

FIELD OF THE INVENTION

The present invention relates to wastewater treatment, and particularly to wastewater treatment systems for onsite applications.

BACKGROUND OF THE INVENTION

The disposal and/or treatment of waste is as old as civilization itself. The waste products of human activity take many forms, and present numerous disposal and sanitation issues. Of particular importance in the last half century has been the preservation and conservation of our natural resources, including groundwater and land, in particular.

The treatment of wastewater is not a new art, and involves essentially three broad aspects: conveyance, treatment, and disposal. Conveyance is more often associated with large systems, such as municipal sewage treatment systems, and involves transporting the wastewater, with associated solids, to a treatment location.

Various treatment systems are known, including large-scale treatment, common to municipalities, which involve activated sludge processing and/or surface discharge to a river or lake. An onsite wastewater system, however, typically involves a septic tank in combination with a dispersal field. Septic tanks were first introduced in the late 1800's when municipal treatment systems had not yet become an established part of the infrastructure of growing towns and cities. The advent of the Environmental Protection Agency and the population growth in urban areas gave rise to the development of large scale sewer and treatment systems. In recent years, the Environmental Protection Agency has changed its philosophy of placing all homes on large treatment systems with surface discharge, to onsite systems with subsurface dispersal. This has been prompted by increased suburban growth.

Septic systems have not radically changed over the past 100 years. A conventional septic system comprises a septic tank that receives wastewater from a residence, and a dispersal field wherein partially treated wastewater drains into a bed of gravel and soil. The most widely used parameter for estimating the organic pollution of wastewater is the biochemical oxygen demand (BOD). BOD involves the measurement of the dissolved oxygen used by microorganisms in the biochemical oxidation of organic matter. The higher the number, the greater the organic pollution. Another parameter used in characterizing the degree of pollution is the total suspended solids (TSS). The greater the BOD and TSS, the greater is the formation of a biomat in the drainfield. The biomat, or growth layer of organic matter, accumulates over a period of time and eventually leads to ultimate failure of the drainfield. Thus, measures which reduce BOD and TSS lead to slower growth of the biomat, and thus prolonged life of the septic system. The conventional septic tank generally produces a BOD of about 250 mg/l and a TSS of about 150 mg/l.

As is generally recognized in the art, there are two key factors that reduce the BOD and TSS levels in wastewater: (1) maximizing the oxygen present over a short duration, usually through super-saturation, or (2) increasing the time of treatment. While these principles work well for surface treatment systems, commonly known as activated sludge processes, there has not been a satisfactory and reliable solution for septic systems. There are known septic dispersal systems that incorporate standpipes, or vents, to provide for some natural circulation of air through the dispersal field, but these systems have had little practical effect in reducing the BOD and/or TSS of the waste stream.

SUMMARY OF THE INVENTION

The present invention is directed to a simple and economical wastewater treatment and dispersal system that addresses the problems described above. That is, the treatment and dispersal system is of the type used in conjunction with a septic tank and is directed at lengthening the time of treatment, maximizing the amount of air/oxygen in contact with the wastewater, or a combination thereof, in the dispersal field to minimize BOD and TSS.

The two prominent aspects, induced air and extended treatment time, are somewhat interchangeable, meaning that when one is increased the other may be decreased. In one embodiment, the present invention includes multiple wastewater conduits and at least one pump for forcing air through each of the conduits. Each of the conduits has at least one discharge opening therefrom, and each of the conduits so configured and the discharge openings, or perforations, so sized and positioned that wastewater flowing into the conduits will stand in each of the conduits below the level of the discharge openings until the desired level of effluent BOD is obtained. The conduits may be configured in a conventional dispersal field arrangement with an inlet header, a series of dispersal conduits branching off of the inlet header, and one or more effluent ends. In this embodiment, the effluent end comprises an effluent header in communication with each of the multiple conduits.

The header end of the system is interconnected to a conventional septic tank so that it receives wastewater flowing from a riser or the like, from the septic tank. The connection to the septic tank may consist of more than one line, but is generally just a single inlet. The header end is configured as a manifold; i.e., a main conduit from which a number of individual treatment and dispersal lines branch outward.

While the number of conduits, in and of itself, is not important to the present invention, an important consideration is the total volume of the combined conduits forming the treatment and dispersal field. Conventional conduits are typically dimensioned as approximately 4 inch diameter lines, but as described in greater detail below, the conduits of the present invention are a minimum of 4 inches in diameter and may be dimensioned up to about 48 inches in diameter, or more. One of the underlying considerations of the present invention is the concept of "retention time". As used herein, "retention time" refers to the total time that the wastewater remains within the treatment system before being dispersed. As will be appreciated by those skilled in the art, the longer the retention time, the greater the duration of biological activity within the system, and the lower the BOD and TSS of the discharged water.

Conventional drainfield conduits are PVC piping or the like, having discharge openings typically aligned and positioned so that the wastewater disperses through the bottom of the piping into the underlying dispersal bed. As has been discussed, this configuration has been used for many years, but does not provide a sufficient retention time or adequate mixing with air/oxygen. As a result, the typical wastewater treatment system comprising a septic tank disperses a treated water having a BOD of about 250 mg/l, or higher.

The conduits of the present invention each have at least one discharge opening that is so positioned to ensure that there will be wastewater standing in a about one half of the volume of each of the conduits. Depending upon whether the system is configured to lengthen the time of treatment or maximize the amount of air/oxygen in contact with the wastewater, or both, the one or more discharge openings may be formed in the upper portion of the conduit or may be formed in a cap, or the like, at the end of the conduit, or a combination thereof. With discharge openings formed in this way, the retention time of the wastewater within the system is maximized, while maximizing the exposure of the wastewater to air, either ambient or forced. Where the one or more discharge openings are formed in the upper portion of the conduit itself, the wastewater eventually rises until it seeps out the discharge openings. Where the one or more discharge openings are formed in an end cap, or flange, the wastewater must travel the full length of the conduit before seeping out, which also maximizes the retention time within the system.

In a second embodiment, using the same or similar conduits, the treatment and dispersal system of the present invention uses forced air through the wastewater itself. Desirably, a pump or fan creates the forced air flow. The flow of air, at a prescribed flow rate, ensures maximum activation, and some agitation, of the wastewater and maximum contact between the wastewater and air. Accordingly, biochemical activity is enhanced with a corresponding reduction in BOD and TSS.

In a third embodiment, there is no forced air at all, and the lower BOD and TSS levels are achieved merely through an extended retention time caused by the unique conduits of the present invention.

Other aspects of the present invention account for climatic variations, utilize residual residential heat, etc. These and other aspects of the present invention will become apparent to those skilled in the art after a reading of the following description of the preferred embodiments when considered in conjunction with the drawings. It should be understood that both the foregoing general description and the following detailed description are exemplary and explanatory only and are not restrictive of the invention as claimed.

DETAILED DESCRIPTION OF THE PREFERRED EMBODIMENTS

The present invention is directed to a wastewater treatment system aimed at addressing the problems described above. The present invention is best understood by first summarizing the prior art and current wastewater treatment systems.

Figure 1:
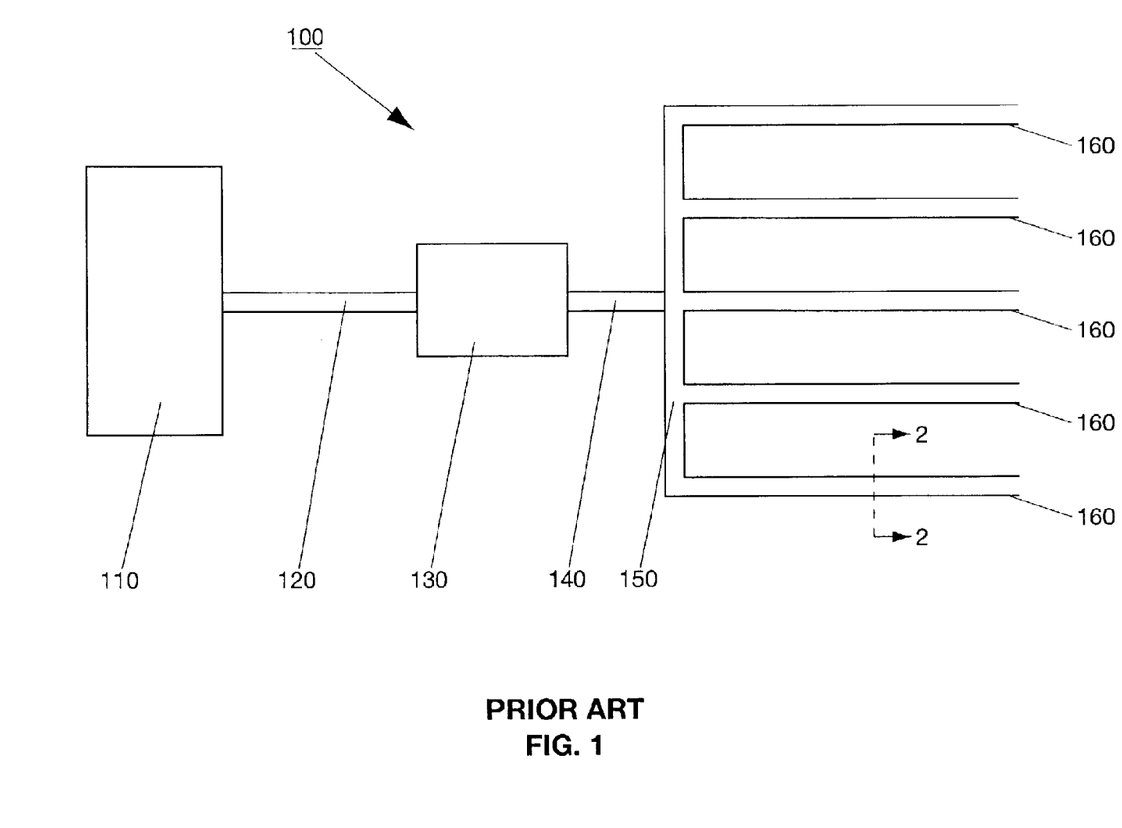
FIG. 1 is a schematic illustrating the structure of a conventional septic system.

Referring first to FIG. 1, a conventional residential wastewater, or septic, system is shown generally a 100. Wastewater, comprising liquids and suspended solids, originates from a residential structure 110, for example, by flowing from sinks, tubs, toilets, etc. At least one septic inlet header 120 directs the wastewater to a septic tank 130. Septic tanks are well known in the art and are generally formed of concrete or steel and have capacities averaging 1000 gallons for a single residence. Within the septic tank 130, the wastewater is deposited, where the separation and organic digestion of the waste begins. Solid matter which floats generally forms a "scum" layer on the surface, non-floatable solids settle to form a "sludge" layer on the bottom of the septic tank 130, and between the two layers is the volume of water. Once the level of waste and water have risen to a certain depth, a septic discharge riser (not shown) forces some of the treated, or mixed, wastewater out of the septic tank 130. This discharge water generally flows through a septic discharge line 140 to an interconnected drainfield that is typically about 500 feet in total length. The drainfield, often referred to as a leaching field, may have any number of configurations, but conventionally has an inlet manifold header 150 from which a plurality of dispersal conduits 160 branch outward.

Figure 2A:
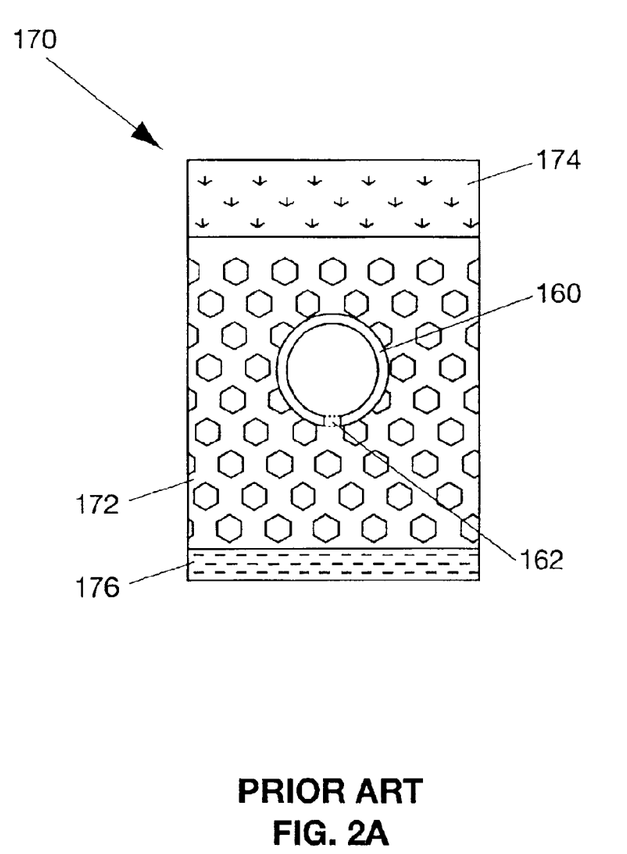
FIG. 2A is an cross-sectional view of a conventional conduit taken along line 2—2 of FIG. 1.
Figure 2B:
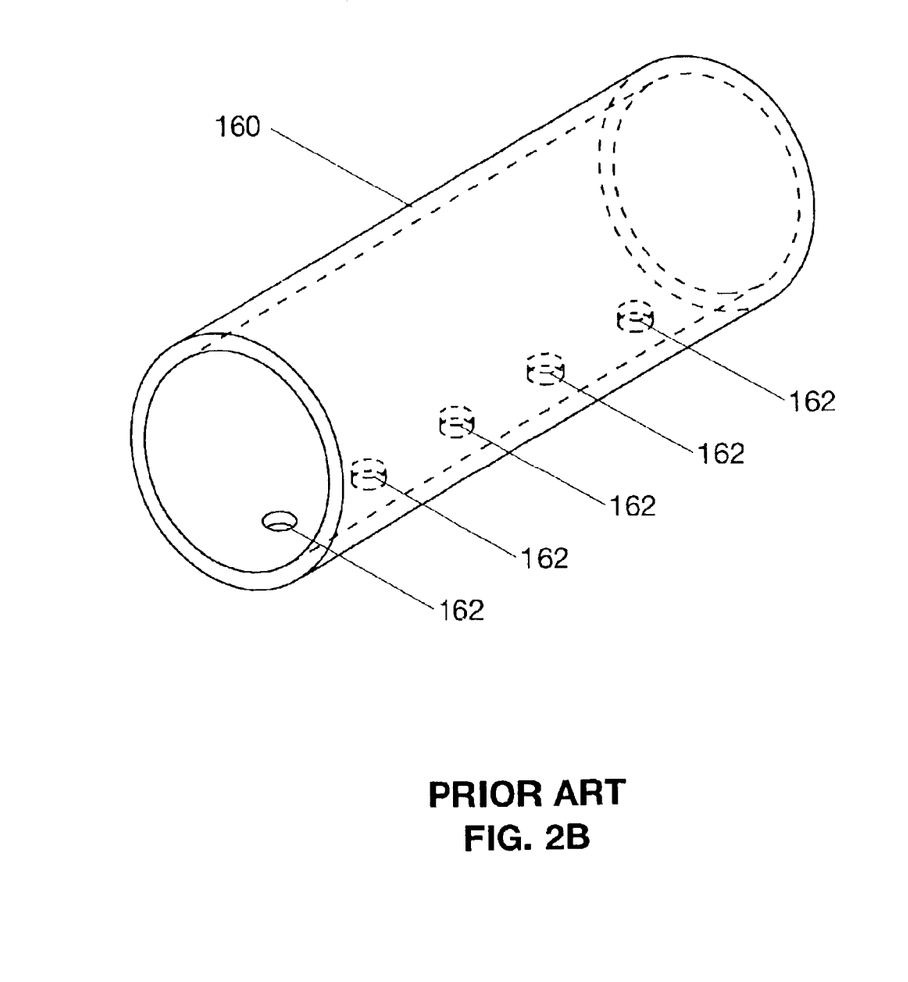
FIG. 2B is a side perspective view of the conventional conduit of FIG. 2A.

The conduits of the prior art are typically four inch diameter corrugated polyvinyl chloride (PVC) pipes having discharge openings formed therethrough their bottoms so that wastewater may seep out of the conduits and into the underlying loose rock layer and soil below the conduit. Referring now to FIGS. 2A and 2B, the conventional conduit and drainfield will be best described. Conduit 160 is conventionally buried within a structured drainfield trench, a cross-section of which is shown generally as 170. Conduits 160 are usually placed over about a 12 inch layer of loose rock or stone 172, such as gravel, and covered with about another 4 inches of similar stone. The stone 172 is covered with soil and turf 174 so that the system is effectively concealed.

Conventional conduits 160 are perforated in such a fashion that the spaced discharge openings, shown as 162 in FIG. 2B, are aligned substantially linearly along the longitudinal axis of the conduit. When installed, the discharge openings 162 are positioned downward. Thus, as wastewater flows into the series of conduits 160, it rather quickly seeps through discharge openings 162 into rock layer 172 where the dispersed wastewater has a dispersed BOD of about 250 mg/l, or higher. At a BOD level this high, the organic digestion process has not been effectively completed. Thus, the settled wastewater begins to form, or grow, a biomat 176 along the base of the drainage trench.

Figure 3:
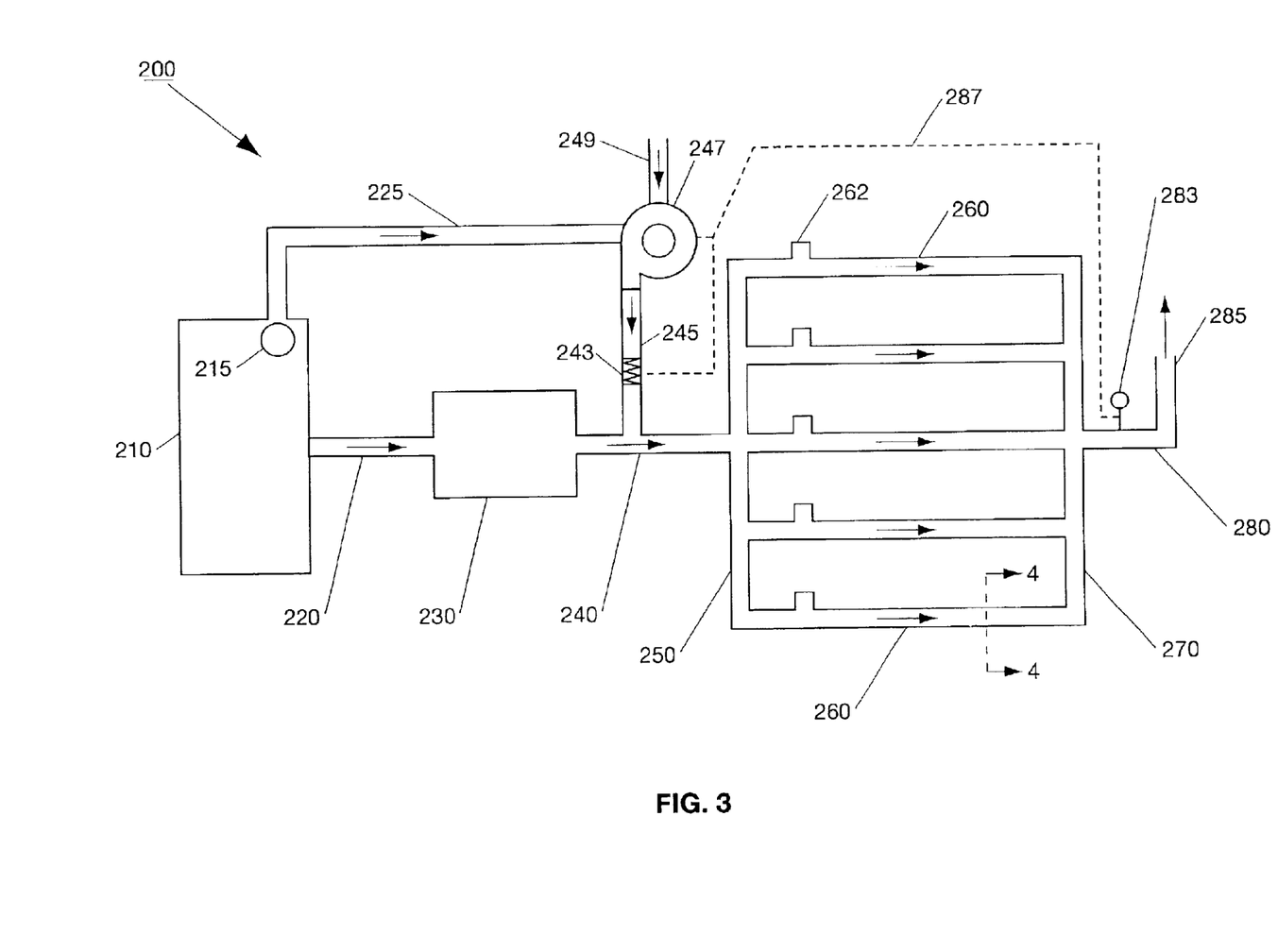
FIG. 3 is a schematic illustrating the structure of the septic system of the present invention.

Turning to FIG. 3, one embodiment of the wastewater treatment system 200 of the present invention is schematically illustrated, As in the conventional system, wastewater derives from a residence 210 which discharges to a septic tank 230 through a sewage line 220. Septic tank 230 is similar in all respects to the septic tank described above. The system of the present invention also has a septic discharge line 240 which discharges wastewater to the treatment and dispersal system.

Figure 4:
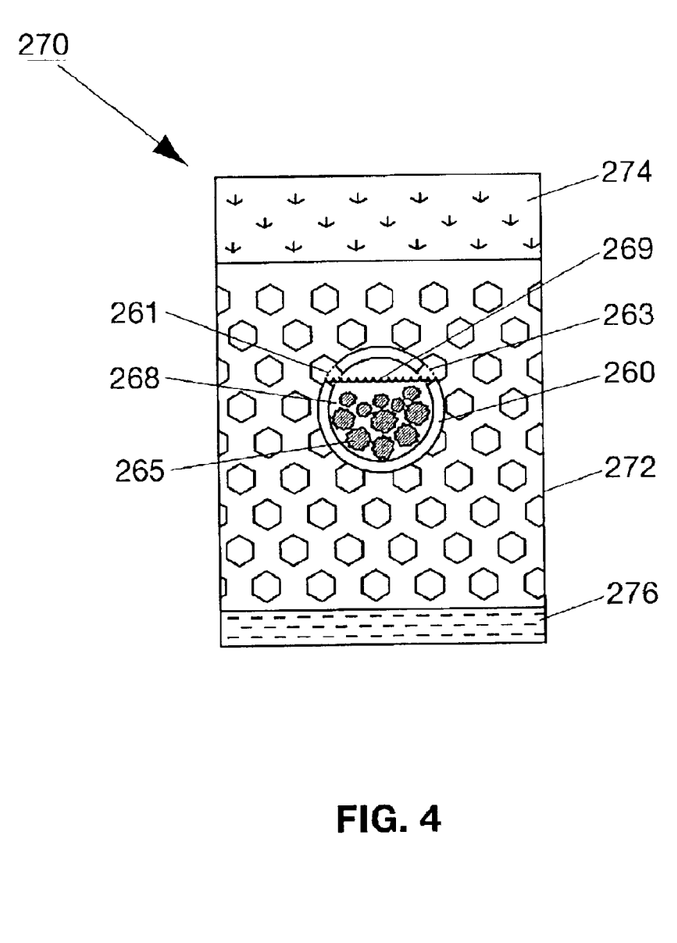
FIG. 4 is an cross-sectional view of a conduit of the present invention taken along line 4—4 of FIG. 3.

A first aspect of the treatment and disposal system 200 of the present invention is the arrangement and configuration of conduit 260. Wastewater flowing from septic discharge line 240 flows first into the system manifold 250 from which the plurality of conduits 260 branch therefrom. Referring now to FIG. 4, a cross-sectional view of a single conduit 260, formed and positioned according to the present invention, is illustrated.

In all respects, except for the growth of the biomat 276, the drainage trench 270 is similar to that of the conventional conduit arrangement. Conduit 260 is positioned within a layer of rock 272. The rock enhances drainage, increases the surface area available for biological activity, and produces voids for oxygen exchange with the settling wastewater within the drainfield 270. Conduit 260 is formed of PVC piping, but other suitable materials that are adaptable for subsurface use may be substituted.

The conduit 260 is desirably of larger diameter than the conduit currently known and widely used. As a longer detention time within the treatment system is desired, the capacity of the system to hold a larger volume of wastewater is important. Thus, conduit 260 is preferably sized to have an outside diameter of between 4 and 48 inches.

By way of example, assume that an average household produces 400 gallons of wastewater per day. For a dispersal field comprising 200 linear feet of 4 inch diameter conduit, the total volume of the dispersal system is approximately 17.4 ft$^3$. In gallons, that is 7.48 gallons/ft$^3 \times$17.4 ft$^3$=130.5 gallons. The average retention time, then, even if the dispersal system could actually detain the volume, of wastewater in the system is 130.5 gallons/400 gallons per day=0.3 days. On the other hand, for a system of the same length using 24 inch conduit, the retention time increases to about 12 days. It is not currently known, however, for onsite dispersal systems to retain any volume of water since the discharge openings in the conduits are positioned on the bottom for immediate drainage.

Figure 4A:
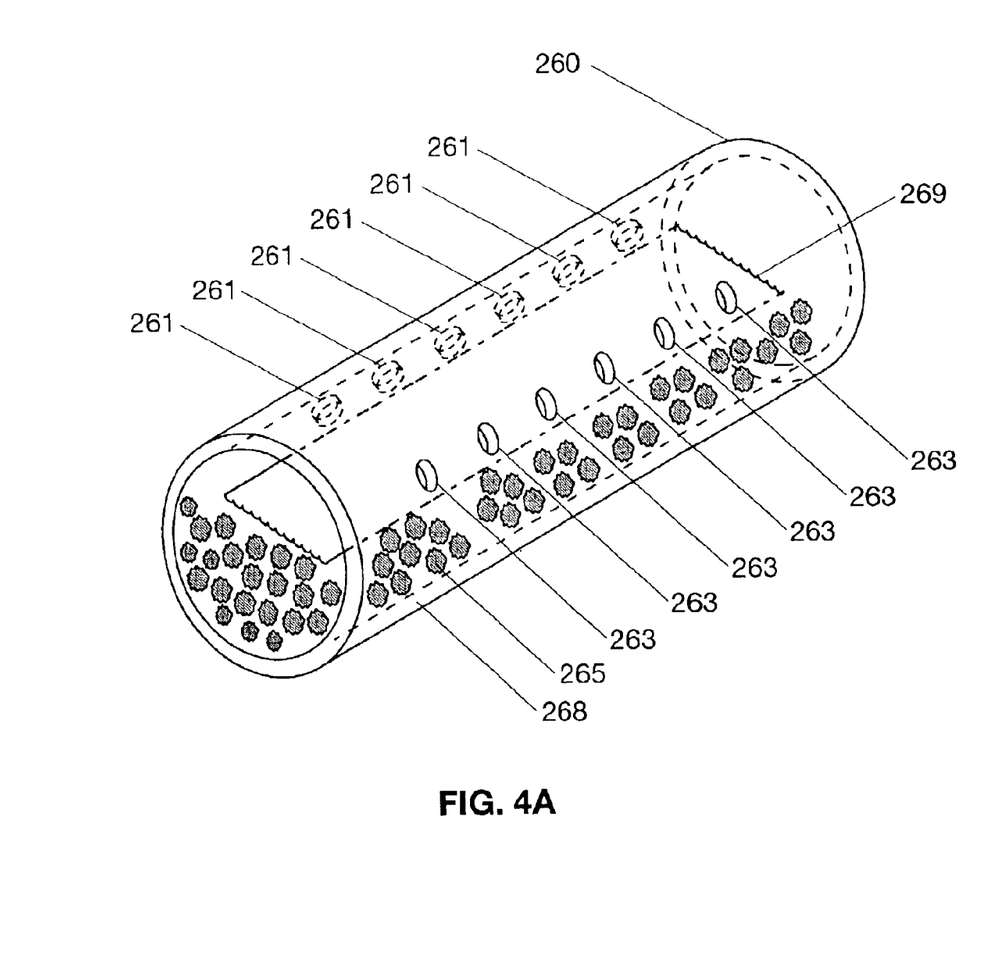
FIG. 4A is a side perspective view of the conduit of FIG. 4.

As shown in FIGS. 4 and 4A, a series of discharge openings 261, 263 are formed therethrough the wall of conduit 260. These discharge openings, however, are so formed that when conduit 260 is installed, discharge openings 261 and 263 are at or above the longitudinal centerline of conduit 260. In this way, wastewater flowing into conduit 260 will be standing at least to the level of the discharge openings 261, 263. This level is shown by the waterline 269. "Freshly" entering wastewater will, thus, mix with the standing water 268 causing some of the wastewater to seep through discharge openings 261 and 263 and into the rock layer 272.

Figure 4B:
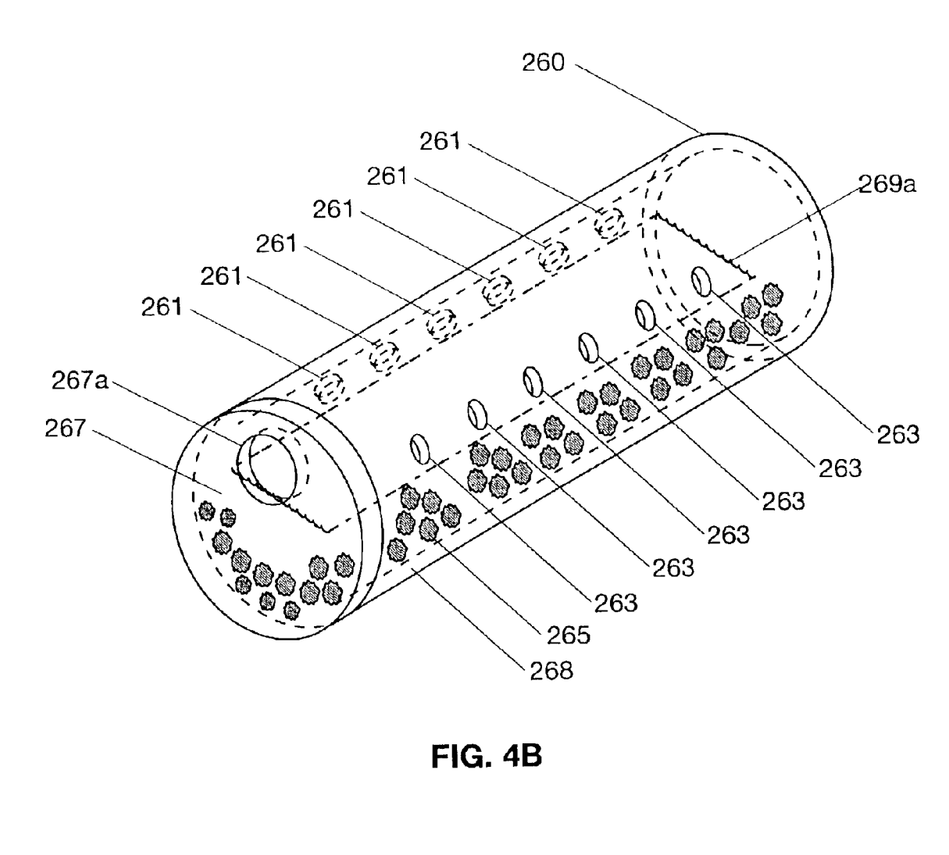
FIG. 4B is a side perspective view of the conduit of FIG. 4A with the addition of an end cap.

FIG. 4B shows a further aspect of the conduit of FIG. 4, including the addition of an end cap 267 at the downstream end of conduit 260. End cap 267 includes a opening 276a. Opening 267a is located lower with respect to the longitudinal centerline of conduit 260 than discharge openings 261, 263 so that opening 267a defines the lower waterline 269a. Opening 267a is, however, above the centerline of conduit 260. In this fashion, the wastewater is urged to flow the entire length of conduit 260, thereby increasing the time that the wastewater remains in the system. While FIG. 4B shows a conduit 260 having discharge openings 261, 263 formed in the upper portion of the conduit 260 in addition to a discharge opening 267a in end cap 267, it will be understood that a single discharge opening 267a may be sufficient, depending upon the configuration of the treatment system. Similarly, where discharge openings 261 or 263, or a combination thereof, are formed in conduit 260, an end cap 267 with discharge opening 267 may not be required, or even desired. As will be appreciated, the number and relative locations of the discharge openings will be selected based on whether the system is configured to maximize retention time, exposure to air/oxygen, or a combination thereof.

A second aspect of the present invention is providing air ventilation through the treatment and dispersal system. Referring to FIG. 3, a schematic of the system of the present invention is shown. Upon leaving the septic tank 230, wastewater flows through the septic discharge line 240 to the dispersal field, where it is received by an inlet manifold 250 that is similar in all respects to the inlet manifold 150 of a conventional system. From the inlet manifold 250, the wastewater flows into the plurality of conduits 260 where it stands to the level of the discharge openings 261, 263, as described above.

To enhance biochemical activity at a rate greater than that achieved through exposure to ambient air, a source of oxygen is continually introduced into the conduits 260. To facilitate this process, a ventilation path must be established. As shown in FIG. 3, an air inlet vent 245 is desirably connected to the septic discharge line 240 between septic tank 230 and inlet manifold 250. With one end of the air inlet vent 245 connected to the line 240, the opposite end 249 extends above ground level to the atmosphere. Thus, the ventilation path extends from inlet vent 245 on the upstream side of the dispersal field, through line 240 and into the inlet manifold 250. From the inlet manifold, the ventilation path extends through the plurality of conduits 260 and into an outlet manifold 270. Outlet manifold 270 is not conventional in dispersal field constructions since wastewater entering the conduits 160 of a conventional system simply seeps into the underlying stone-filled trench beneath the conduits 160. While wastewater is not expected to flow into outlet manifold 270, the outlet manifold more efficiently creates a ventilation path than individual vents (not shown) extending upward from each of the conduits 260. There may be design situations, however, where such a configuration is more desirable to practice the present invention. Extending outward from outlet manifold 270 is an a ventilation outlet line 280. Desirably, the ventilation outlet line 280 is a single line extending upward from the outlet manifold 270 to a point above ground level; however, layout considerations may dictate multiple connecting lines. For instance, ventilation outlet line 280 may extend outward a sufficient distance from the residence so that noxious gases and odors will not provide a nuisance to the household occupants. In such a case, the ventilation outlet line 280 may be substantially longer than actually necessary, and may have an interconnected atmospheric vent 285 connected thereto, and extending above ground level.

While a ventilation path permits a free flow of air and an exchange of gases between the atmosphere and the dispersal field, the system of the present invention desirably includes a motive source for forcing airflow through the dispersal system. As shown in FIG. 3, one aspect of a forced ventilation system is to provide a pump 247, fan, or compressor, connected to the inlet vent 245. One suitable fan is a axial fax available from W. W. Grainger, Inc. of Chicago, Ill. as Item No. 4WT47. As will be explained in greater detail below, and as those skilled in the heating, ventilation, and air conditioning arts will understand, pump or fan 247, whether as a single unit, or a plurality of individual pumps or fans, must be properly sized for the size and configuration of the dispersal field and the volume of wastewater estimated to be standing in the dispersal field. Further, the flow of air through the conduits 260 agitates the standing wastewater, creating an aeration effect, whereby the biochemical activity within the conduits is enhanced and accelerated.

It should here be pointed out that the dispersal field with the enlarged conduits having discharge openings in the upper portions offers an improved system with or without a system of forced air. In such as case, the fan 247 and inlet vent 245 are merely not present.

To promote additional activity within the standing water 268 in conduit 260, a bed of stone or rock 265, such as gravel, may be placed at the time of installing the dispersal field within the lower portion of each of the conduits 260. As used herein, "stone" or "rock" refer to either natural or synthetic objects that are so placed within a selected volume.

Figure 5:
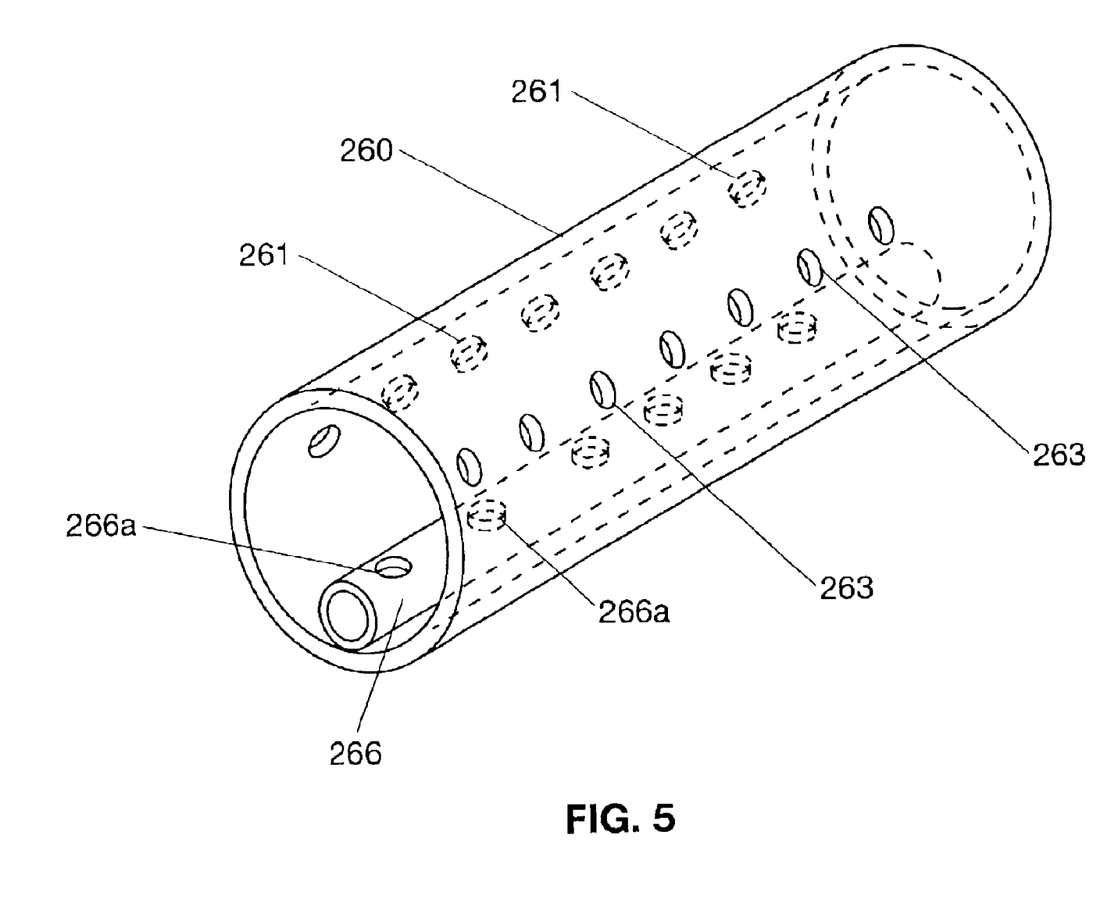
FIG. 5 is a side perspective view of the conduit of the present invention, illustrating the placement of an alternative aeration means.

Turning now to FIG. 5, a further aspect of the present invention is the addition of an agitator, or aerator 266 to the conduit of the present invention. This may comprise one or more mechanical agitators, or a perforated aeration hose from which compressed air is blown through discharge openings 266a, maximizing exposure and mixing of the standing wastewater with air/oxygen.

Figure 6:
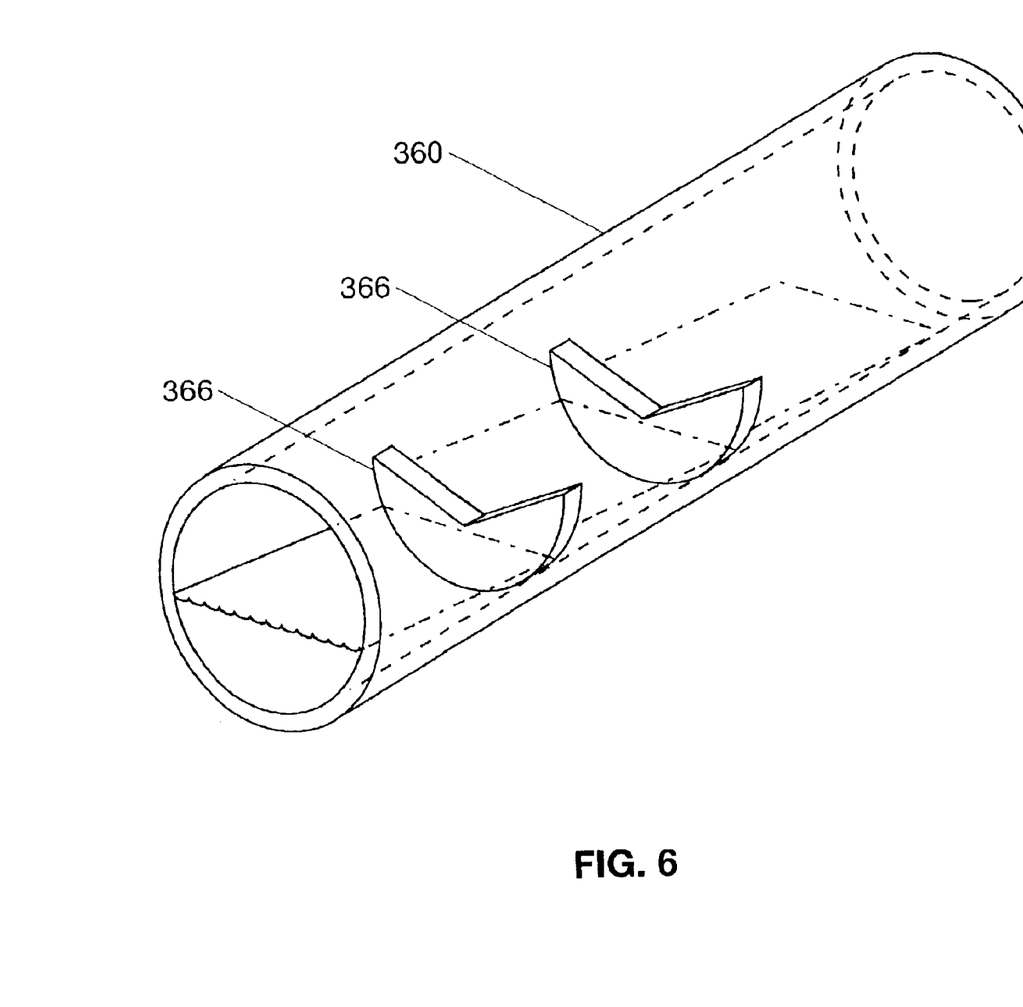
FIG. 6 is a side perspective view of an alternative configuration for dispersal field conduits, incorporating weirs, in a sloped conduit.
Figure 7:
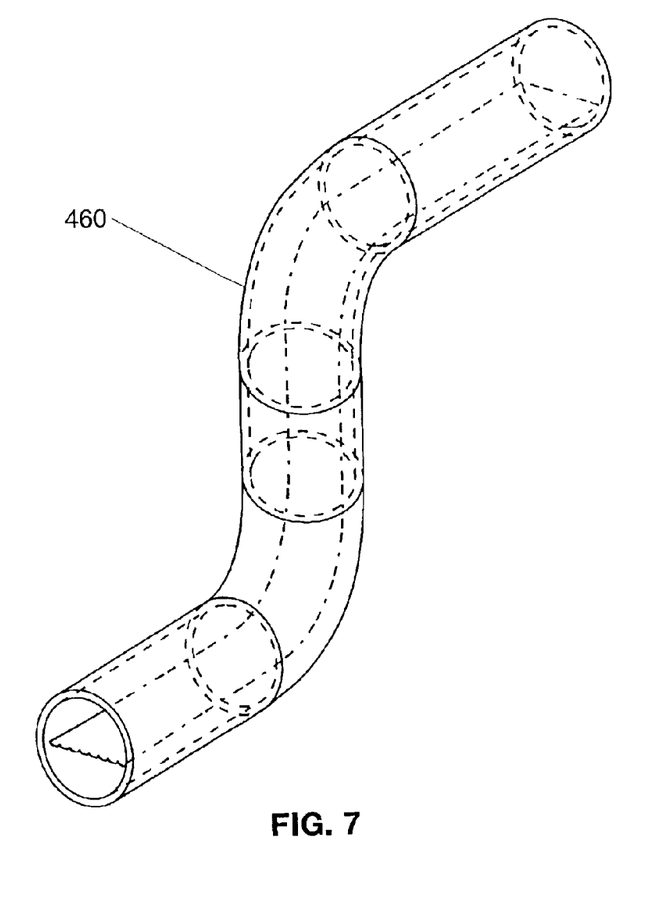
FIG. 7 is a side view of an alternative configuration for dispersal field conduits, illustrating a stepped conduit construction.

It will be understood that the configuration of conduits in the dispersal field is not limited to generally horizontal placement. Alternatively, other conduit constructions may be substituted and configured to enhance aeration of the wastewater standing, or flowing, in the dispersal field. As shown in FIG. 6, conduits 360 may be installed in a sloping orientation. To facilitate controlled flow, while providing aeration to the wastewater passing therein, a series of spaced apart dams, or weirs 366 is installed within the conduit 360. Similarly, conduits 460 may be formed in a step-like arrangement so that wastewater cascades along the conduit from one level to another, as shown in FIG. 7.

Where climatic conditions are such that colder temperature extremes are expected, or in cooler geographical areas, it is desirably to introduce an warmer, or heated, airflow into the dispersal system. This may be accomplished in a number of ways. First, the size and type of pump 247 may be so chosen that the pump or fan heat, in and of itself, provides sufficient warmth. Alternatively, a more energy efficient configuration is to make use of residual household heat. For example, and as shown in FIG. 3, a vent line 225 may draw warm attic, hot water heater, furnace, dryer, etc. heat into the inlet vent 245. Desirably, the heating means are automated responsive to changes in temperature. For example, a temperature sensor 283, such as a thermocouple or the like, monitors the dispersal field temperature and initiates heating at a selected temperature setpoint. As shown in FIG. 3, temperature sensor 283 is located in the outlet line 280, or other position that approximates the average temperature of the conduits 260 in the dispersal field. As shown by the dotted line 287, the temperature sensor 283 is electrically interconnected to the pump or fan 247, and to an inline heating element 243 that is located in the inlet vent 245.

Extending the service life of the dispersal field is also enchanced by periodic cleaning. Accordingly, access cleaning ports 262 are desirably provided at a point along the lengths of the conduits 260. The cleaning ports may be T-sections of PVC with screw-in plugs, or the like, for easy access. Cleaning by be accomplished by any of the known cleaning means for subsurface lines, such as brushing, pressure washing, etc. Vents 245 and 285 permit vacuuming of the conduits without fear of collapsing the system or damaging system components.

As described above, it has been found that effluent waste BOD is directly related to hydraulic retention time and treatment efficiency. As defined herein, "hydraulic retention time" refers to the time duration for which a given volume of wastewater remains within the treatment system. As shown in the table below, it has been found that starting with a Day Zero BOD of 300 mg/l, exposure of wastewater to ambient (no flow) air is sufficient to reduce the BOD to approximately 128 mg/l in about 5 days. The applicable equation is $L_t = Le^{-K't}$, where L=influent BOD mg/l, $L_t$=effluent BOD at time "t" in days, and K' is the rate constant for a given waste, usually accepted as 0.17 for residential wastewater (*Wastewater Engineering Treatment/Disposal/Reuse*, Metcalf and Eddy, Inc., McGraw-Hill, N.Y. 2d ed. 1979).

| Time (days) | BOD of Effluent (mg/l) |
| --- | --- |
| 0 | 300 |
| 5 | 128 |
| 10 | 55 |
| 20 | 10 |

It is seen that the longer the retention time in an aerobic environment, the better the treatment. While conventional septic tanks have theoretical retention times of three to four days due to the sludge and scum volume, and the fact that about two-thirds of the daily flow of wastewater is generated in less than four hours for an average household, the effective retention time is actually only between 3 and 4 hours (*Septic Tank Effects on Ground Water Quality*, Larry W. Canter and Robert C. Knox, Lewis Publishers, Inc., Chelsea, Mich., $4^{th}$ ed. 1991). Also, as described above, it has been found that forcing air through the conduits in a dispersal field is another way to effectively reduce the BOD of the effluent. It has also been found that the manner of introducing air (oxygen) into the wastewater to be treated is best represented by an activated sludge process. The activated sludge process, common in centralized wastewater treatment plants, places large amounts of air into a liquid regime, which is conducive for the bacteria to consume the waste. Introducing air into the wastewater can effectively reduce the retention time of wastewater in the system, or for the same retention time, could render a cleaner effluent with a lower BOD. For instance, by introducing a certain volume of air/oxygen to wastewater that would have a BOD of about 128 mg/l after about 5 days of retention time alone, the BOD of the effluent could be further reduced to about 30 mg/l in the same retention time. The formula for estimating this is: Effluent BOD=Influent soluble $BOD_5$ escaping treatment (S)+$BOD_5$ of effluent suspended solids. For the average household producing about 400 gallons per day of wastewater, the air requirement is about 0.61 $m^3$/day. At an assumed process efficiency of 8%, the actual air requirement is (0.61 $m^3$/day) 0.08=8 $m^3$/day. Using a standard safety factor of 2, the estimated minimum air requirement is therefore about 16 $m^3$/day.

Inducing air through a shallow pipe is somewhat less efficient than a tank 2 or 3 meters deep, however, the contact time is substantially greater. Therefore, the efficiency is substantially equal to the activated sludge process. An air requirement for the system of the present invention of 16 $m^3$/day is equivalent to about 40 $ft^3$/minute. The fan or pump selected for the system is, therefore, sized based upon the estimated daily wastewater volume and BOD.

Although the present invention has been described with a preferred embodiment, it is to be understood that modifications and variations may be utilized without departing from the spirit and scope of the invention, as those skilled in the art will readily understand. Such modifications and variations are considered to be within the purview and scope of the appended claims and their equivalents.

I claim:

1. A dispersal field for a wastewater treatment system of the type used in conjunction with a septic tank, the dispersal field comprising at least one conduit, each conduit having a closed bottom and at least one discharge opening at a point spaced above the closed bottom, each conduit so configured and the discharge openings so sized and positioned that a volume of wastewater flowing into the conduits is retained by and will stand above the bottom of the at least one conduit below the level of the discharge openings until it has a BOD of less than about 125 mg/l.

2. The dispersal field of claim 1 wherein the diameter of the at least one conduit is at least 12 inches.

3. The dispersal field of claim 1 wherein the at least one conduit is sloped downward to facilitate flow of wastewater through substantially the length of each of said conduits.

4. The dispersal field of claim 3 further including at least one weir positioned within the at least one conduit for regulating the rate at which wastewater flows through said conduits.

5. The dispersal field of claim 1 wherein the at least one conduit comprises at least one substantially vertical portion and at least one substantially horizontal portion to facilitate the flow of wastewater through substantially the length of said conduits.

6. The dispersal field of claim 1 wherein each of said discharge openings is at least at or above a plane extending horizontally through the center of the at least one conduit.

7. The dispersal field of claim 1, further including:
(a) an inlet manifold for receiving wastewater into said treatment and dispersal system, said inlet manifold interconnected to each conduit;
(b) a vent connected to said manifold for the introduction of air into said inlet manifold;
(c) an outlet manifold interconnected to each conduit; and
(d) a vent connected to said outlet manifold for the escape of air passing through said outlet manifold.

8. The dispersal field of claim 1 further including a layer of stone positioned along at least some portion of the closed bottom of each conduit for enhancing biological activity.

9. A dispersal field for a wastewater treatment system of the type used in conjunction with a septic tank, comprising:
(a) an inlet manifold for receiving wastewater from a septic tank; and
(b) at least one conduit, each conduit having a closed bottom and at least one discharge opening at a point spaced above the closed bottom, each conduit so configured and the discharge openings so sized and positioned that wastewater flowing into the conduits is retained by and will stand above the bottom of the at least one conduit below the level of the discharge openings until it has a BOD of less than about 125 mg/l.

10. The dispersal field of claim 9 wherein the diameter of each conduit is at least 12 inches.

11. The dispersal field of claim 9 wherein each conduit is sloped downward to facilitate flow of wastewater through substantially the length of each conduit.

12. The dispersal field of claim 11 further including at least one weir positioned within each conduit for regulating the rate at which wastewater flows through said conduit.

13. The dispersal field of claim 9 wherein each conduit comprises at least one substantially vertical portion and at least one substantially horizontal portion to facilitate the flow of wastewater through substantially the length of said conduit.

14. The dispersal field of claim 9 wherein each of said discharge openings is at least at or above a plane extending horizontally through the center of each of said conduits.

15. A wastewater treatment and dispersal system, comprising:

(a) a septic tank;
(b) an inlet manifold for receiving wastewater from a septic tank; and
(c) at least one conduit, each conduit having a closed bottom and at least one discharge opening at a point spaced above the closed bottom, each conduit so configured and the discharge openings so sized and positioned that wastewater flowing into the conduits is retained by and will stand above the bottom of the at least one conduit below the level of the discharge openings until it has a BOD of less than about 125 mg/l.

16. The system of claim 15 wherein the diameter of each conduit is at least 12 inches.

17. The system of claim 15 wherein each conduit is sloped downward to facilitate flow of wastewater through substantially the length of each conduit.

18. The system of claim 17 further including at least one weir positioned within each conduit for regulating the rate at which wastewater flows through said conduit.

19. The system of claim 15 wherein each conduit comprises at least one substantially vertical portion and at least one substantially horizontal portion to facilitate the flow of wastewater through substantially the length of said conduit.

20. The system of claim 15 wherein each of said discharge openings is at least at or above a plane extending horizontally through the center of each conduit.

21. A wastewater treatment and dispersal system of the type used in conjunction with a septic tank, comprising:
(a) an inlet manifold for receiving wastewater from a septic tank;
(b) at least one conduit connected to and branching from the inlet manifold, each conduit having a closed bottom and at least one discharge opening at a point spaced above the closed bottom, each conduit so configured and the discharge openings sized and positioned that a volume of wastewater flowing into the conduits is retained by and will stand above the bottom of the at least one conduit below the level of the discharge openings until it has a BOD of less than about 125 mg/l;
(c) an outlet manifold interconnected to each conduit; and
(d) a forced air system including a ventilation path connected to each conduit in the area above the wastewater thereby enhancing the biological activity in the wastewater.

22. The system of claim 21 wherein the diameter of each conduit is at least 12 inches.

23. The system of claim 21 wherein each conduit is sloped downward to facilitate flow of wastewater through substantially the length of each conduit.

24. The system of claim 23 further including at least one weir positioned within each conduit for regulating the rate at which wastewater flows through said conduit.

25. The system of claim 21 wherein each conduit comprises at least one substantially vertical portion and at least one substantially horizontal portion to facilitate the flow of wastewater through substantially the length of said conduit.

26. The system of claim 21 wherein the plurality of discharge openings are at least at or above a plane extending horizontally through the center of each conduit.

27. The system of claim 26 wherein at least one discharge opening is located substantially at the horizontal center of each conduit.

28. The system of claim 21, further including an inlet vent connected to said inlet manifold and an outlet vent connected to the outlet manifold.

29. The system of claim 21 further including a layer of stone positioned along at least some portion of the closed bottom of each conduit for enhancing biological activity.

30. The system of claim 21 wherein the forced air system includes an air moving apparatus selected from the group consisting of a pump, an inline axial fan, and a vacuum pump.

31. The system of claim 30, further including at least one temperature element for sensing the temperature in each conduit, the temperature sensor electrically interconnected to a means for automatically heating the air circulating through the conduit.

32. The system of claim 31, wherein the heating means are selected from the group of heating means consisting of a pump, fan, heating element, and residual household heat.

33. A wastewater treatment and dispersal system of the type used in conjunction with a septic tank, comprising:
  (a) an inlet manifold for receiving wastewater from a septic tank;
  (b) at least one conduit connected to and branching from the inlet manifold, each conduit having a closed bottom and at least one discharge opening at a point spaced above the closed bottom, each conduit so configured and the discharge openings sized and positioned that a volume of wastewater flowing into the conduits is retained by and will stand above the bottom of the at least one conduit below the level of the discharge openings until it has a BOD of less than about 125 mg/l;
  (c) an outlet manifold interconnected to each conduit; and
  (d) a forced air system including a perforated aeration hose in the bottom of each conduit to circulate air through the wastewater thereby agitating the wastewater and enhancing the biological activity in the wastewater.

34. The system of claim 33 wherein the diameter of each conduit is at least 12 inches.

35. The system of claim 33 wherein each conduits is sloped downward to facilitate flow of wastewater through substantially the length of each conduit.

36. The system of claim 35 further including at least one weir positioned within each conduit for regulating the rate at which wastewater flows through said conduit.

37. The system of claim 33 wherein each conduit comprises at least one substantially vertical portion and at least one substantially horizontal portion to facilitate the flow of wastewater through substantially the length conduit.

38. The system of claim 33 wherein the plurality of discharge openings are at least at or above a plane extending horizontally through the center of each conduit.

39. The system of claim 38 wherein at least one discharge opening is located substantially at the horizontal center conduit.

40. The system of claim 33, further including an outlet vent connected to said inlet manifold.

41. The system of claim 33, further including an outlet vent connected to said outlet manifold.

42. A wastewater treatment and dispersal system, comprising:
  (a) a septic tank;
  (b) an inlet manifold for receiving wastewater from a septic tank;
  (c) at least one conduit connected to and branching from the inlet manifold, each conduit having a closed bottom and at least one discharge opening at a point spaced above the closed bottom, each conduit so configured and the discharge openings sized and positioned that a volume of wastewater flowing into the conduits is retained by and will stand above the bottom of the at least one conduit below the level of the discharge openings until it has a BOD of less than about 125 mg/l;
  (d) an outlet manifold interconnected to each conduit; and
  (e) a forced air system including a ventilation path connected to each conduit in the area above the wastewater thereby enhancing the biological activity in the wastewater.

43. The system of claim 42 wherein the diameter of each conduit is at least 12 inches.

44. The system of claim 42 wherein each conduits is sloped downward to facilitate flow of wastewater through substantially the length of each conduit.

45. The system of claim 44 further including at least one weir positioned within each conduit for regulating the rate at which wastewater flows through said conduit.

46. The system of claim 42 wherein each conduit comprises at least one substantially vertical portion and at least one substantially horizontal portion to facilitate the flow of wastewater through substantially the length conduit.

47. The system of claim 42 wherein the plurality of discharge openings are at least at or above a plane extending horizontally through the center of each conduit.

48. The system of claim 47 wherein at least one discharge opening is located substantially at the horizontal center of each conduit.

49. The system of claim 42, further including an inlet vent connected to said inlet manifold and an outlet vent connected to the outlet manifold.

50. The system of claim 42 further including a layer of stone positioned along at least some portion of the closed bottom of each conduit for enhancing biological activity.

51. The system of claim 42 wherein the forced air system includes an air moving apparatus selected from the group consisting of a pump, an inline axial fan, and a vacuum pump.

52. The system of claim 51, further including at least one temperature element for sensing the temperature in the plurality of conduits, the temperature sensor electrically interconnected to a means for automatically heating the air circulating through each conduit.

53. The system of claim 52, wherein the heating means are selected from the group of heating means consisting of a pump, fan, heating element, and residual household heat.

54. A system as set forth in claim 42 and further including a forced air system including a perforated aeration hose in the bottom of each conduit to circulate air through the wastewater thereby agitating the wastewater and enhancing the biological activity in the wastewater.

55. A method for treating wastewater of the type discharged from a conventional septic tank into a dispersal field formed of at least one perforated conduit, comprising:
  (a) receiving wastewater from a septic tank system into at least one conduit having a closed bottom, each conduit so configured as to cause a volume of said wastewater to stand above the bottom of the at least one conduit; and
  (b) forcing air through each conduit to agitate the wastewater standing in said conduit, resulting in maximum exposure of the wastewater to oxygen, wherein the wastewater seeping outward from said conduit has a BOD less than about 125 mg/l.

* * * * *